(12) United States Patent
Selvakani et al.

(10) Patent No.: US 11,595,894 B2
(45) Date of Patent: Feb. 28, 2023

(54) METHOD AND SYSTEM FOR SAVING POWER OF A BATTERY ASSOCIATED WITH ITEM/S

(71) Applicant: Carrier Corporation, Palm Beach Gardens, FL (US)

(72) Inventors: Kanna Selvakani, Telangana (IN); Luca F. Bertuccelli, Beverly, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/253,185

(22) PCT Filed: Aug. 24, 2020

(86) PCT No.: PCT/IB2020/057903
§ 371 (c)(1),
(2) Date: Dec. 17, 2020

(87) PCT Pub. No.: WO2021/053436
PCT Pub. Date: Mar. 25, 2021

(65) Prior Publication Data
US 2022/0210737 A1 Jun. 30, 2022

(30) Foreign Application Priority Data
Sep. 20, 2019 (IN) .............................. 201911038085

(51) Int. Cl.
*H04W 52/02* (2009.01)
*H04W 4/029* (2018.01)
(52) U.S. Cl.
CPC ....... *H04W 52/0219* (2013.01); *H04W 4/029* (2018.02); *H04W 52/0277* (2013.01)
(58) Field of Classification Search
CPC ......... H04W 4/00–08; H04W 4/30–38; H04W 4/20
See application file for complete search history.

(56) References Cited

U.S. PATENT DOCUMENTS 6,700,493 B1 * 3/2004 Robinson ........... G08B 21/0294
340/539.2
7,701,347 B2 4/2010 Richards
(Continued)

FOREIGN PATENT DOCUMENTS

CN 203673312 U 6/2014
CN 104602926 A 5/2015
(Continued)

OTHER PUBLICATIONS

Alfares et al.; "Iterative Clustering for Energy-Efficient Large-Scale Tracking Systems"; Arxiv.org, Cornell University Library, XP081026960; Feb. 8, 2019; pp. 1-16.
(Continued)

*Primary Examiner* — San Htun
(74) *Attorney, Agent, or Firm* — Cantor Colburn LLP

(57) ABSTRACT

Aspects of the invention are directed towards a system and method for saving power of a battery associated with item/s. One or more embodiments of the invention describe the method comprising steps of receiving a location and a charged status of a battery associated with each of one or more items placed inside a container. The method further describes steps of assigning a cluster to a group of items from the one or more items based on the location of each of the one or more items and identifying a master item from the group of items based on the charged status of each item in the cluster. The method also describes steps of transmitting a message to the master item for sensing a parameter for the group of items in the cluster and receiving a sensed parameter from the master item for the group of items.

18 Claims, 5 Drawing Sheets

(56) References Cited

U.S. PATENT DOCUMENTS

| | | | |
|---|---|---|---|
| 9,542,823 B1 | 1/2017 | Russell et al. | |
| 9,846,086 B1 | 12/2017 | Robinson et al. | |
| 10,093,232 B2 | 10/2018 | Troutman et al. | |
| 10,309,945 B2 | 6/2019 | Mandava et al. | |
| 10,311,702 B2 | 6/2019 | Nygren et al. | |
| 10,388,161 B2 | 8/2019 | Troutman et al. | |
| 2006/0244573 A1* | 11/2006 | Wendler | G08G 1/20 340/333 |
| 2008/0061963 A1* | 3/2008 | Schnitz | G06Q 20/203 340/539.13 |
| 2009/0295564 A1* | 12/2009 | Twitchell, Jr. | H04B 1/38 340/539.1 |
| 2013/0070636 A1 | 3/2013 | Farley et al. | |
| 2015/0241566 A1* | 8/2015 | Chakraborty | G01S 19/34 342/357.74 |
| 2018/0018618 A1* | 1/2018 | Groseclose | G06Q 10/08 |
| 2018/0249292 A1 | 8/2018 | Skaaksrud | |

FOREIGN PATENT DOCUMENTS

| | | |
|---|---|---|
| CN | 103529814 B | 1/2016 |
| WO | 2016140969 A2 | 9/2016 |

OTHER PUBLICATIONS

International Search Report for International Application No. PCT/IB2020/057903; International Filing Date Aug. 24, 2020; dated Dec. 15, 2020; 4 pages.

Written Opinion for International Application No. PCT/IB2020/057903; International Filing Date: Aug. 24, 2020; dated Dec. 15, 2020; 7 pages.

* cited by examiner

METHOD AND SYSTEM FOR SAVING POWER OF A BATTERY ASSOCIATED WITH ITEM/S

CROSS REFERENCE TO RELATED APPLICATIONS

This application is a National Stage application of PCT/IB2020/057903, filed Aug. 24, 2020, which claims the benefit of IN Application No. 201911038085, filed Sep. 20, 2019, both of which are incorporated by reference in their entirety herein.

TECHNICAL FIELD OF INVENTION

The present invention generally relates to tracking of items. More particularly, the invention relates to a system and a method for saving power of a battery associated with an item/s.

BACKGROUND OF THE INVENTION

Electronic circuits are generally mounted on items for providing various functionalities to the items. An electronic circuit comprises one or more sensors, communication modules, location modules and other components. An electronic circuit is powered by a battery and as it operates, till the battery gets drained. For instance, an electronic circuit may consume power from the battery while performing data transmission or while processing data. Hence a battery associated with an electronic circuit has a limited life span and can only be used until it is not depleted. After the battery gets consumed or exhausted, items cannot perform any operation, thus making them non-operational.

Currently, there are solutions available to save power of a battery and to prevent an item from becoming non-operational due to lack of power in a battery. However, such solutions fail to provide an effective approach to preserve power of a battery or to prevent electronic circuits with items from becoming non-operational.

In view of the afore-mentioned problems in the existing solutions, there is a need of an efficient and effective system and a method for preserving power of a battery associated with an item. There is also a need to extend life of a battery by saving power. There is also a requirement for preventing electronic circuits associated with an item from becoming non-operational due to lack of power in a battery. In order to solve problems in the existing solutions, a system and a method are disclosed.

SUMMARY OF THE INVENTION

Various embodiments of the invention describe a system for saving power of a battery associated with item/s. The system comprises a container, one or more items placed inside the container and a server. The container comprises a beacon adapted to broadcast a signal inside the container. The one or more items placed inside the container comprise a location detection module adapted to determine a location based on the signal received from the beacon. The one or more items also comprise a battery level determination module adapted to determine a charged status of a battery associated with each of the one or more items and a transmitter adapted to transmit the location and the charged status of the battery associated with each of the one or more items to the server. The server comprises a receiver adapted to receive the location and the charged status of the battery associated with each of the one or more items from the transmitter of the one or more items. The server further comprises a clustering unit adapted to assign a cluster to a group of items from the one or more items based on the location of each of the one or more items and a processor adapted to identify a master item from the group of items in the cluster based on the charged status of each item in the cluster. The server also comprises a transmitter adapted to transmit a message to the master item for sensing a parameter inside the container for the group of items in the cluster and the receiver further adapted to receive a sensed parameter for the group of items in the cluster from the master item in response to the message.

In an embodiment of the invention, the location detection module is adapted to determine the location of each of the one or more items in the container based on an angle of arrival of the signal from the beacon.

In another embodiment of the invention, the signal from the beacon is utilized to determine a first factor related to a height of each of the one or more items from bottom of the container, a second factor related to a distance between each of the one or more items and a top wall of the container, and a third factor related to a distance between each of the one or more items and the beacon in the container.

In yet another embodiment of the invention, the clustering unit is adapted to assign a same cluster to a group of items when a first factor, a second factor and a third factor of the one or more items fall within a threshold value.

In still another embodiment of the invention, the processor is adapted to identify the master item by ranking the group of items in the cluster based on a charged status of a battery associated with each item in the cluster. Further, the master item is ranked higher than other items in the cluster.

In a different embodiment of the invention, the charged status of a battery associated with the master item is higher than each of charged status of a battery associated with other items in the cluster.

In yet another embodiment of the invention, the master item transmits the sensed parameter to the server on behalf of other items in the cluster.

In another embodiment of the invention, each of the group of items in the cluster act in a pre-defined behavior.

In an embodiment of the invention, the master item collects sensed parameter from other items in the cluster and transmit the sensed parameter to the server when the other items in the cluster do not act in a pre-defined behavior.

In another embodiment of the invention, the parameter comprises a temperature parameter, a humidity parameter, a fire parameter, or a gas parameter.

Various embodiments of the invention describe a method for saving power of a battery associated with item/s. The method comprises steps of receiving a location and a charged status of a battery associated with each of one or more items placed inside a container. The method further comprises assigning a cluster to a group of items from the one or more items based on the location of each of the one or more items and identifying a master item from the group of items in the cluster based on the charged status of each item in the cluster. The method also comprises transmitting a message to the master item for sensing a parameter inside the container for the group of items in the cluster and receiving a sensed parameter for the group of items in the cluster from the master item in response to the message.

In another embodiment of the invention, the location of each of the one or more items is determined based on an angle of arrival of a signal transmitted by a beacon of the container.

In a different embodiment of the invention, the signal from the beacon is utilized to determine a first factor related to a height of each of the one or more items from bottom of the container, a second factor related to a distance between each of the one or more items and a top wall of the container, and a third factor related to a distance between each of the one or more items and the beacon in the container.

In an embodiment of the invention, the group of items are assigned a same cluster when a first factor, a second factor and a third factor of the one or more items fall within a threshold value.

In another embodiment of the invention, the master item is identified by ranking the group of items in the cluster based on a charged status of a battery associated with each item in the cluster. Further, the master item is ranked higher than other items in the cluster.

In yet another embodiment of the invention, the master item transmits the sensed parameter to the server on behalf of other items in the cluster.

In still another embodiment of the invention, each of the group of items in the cluster act in a pre-defined behavior.

In different embodiment of the invention, a computer readable medium is disclosed for saving power of a battery associated with item/s. The computer readable medium comprises one or more processors and a memory is coupled to the one or more processors, the memory stores instructions executed by the one or more processors. The memory stores instructions executed by the one or more processors are configured to receive a location and a charged status of a battery associated with each of one or more items placed inside a container. The memory stores instructions executed by the one or more processors are further configured to assign a cluster to a group of items from the one or more items based on the location of each of the one or more items and identify a master item from the group of items in the cluster based on the charged status of each item in the cluster. The memory stores instructions executed by the one or more processors are also configured to transmit a message to the master item for sensing a parameter inside the container for the group of items in the cluster and receive a sensed parameter for the group of items in the cluster from the master item in response to the message.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
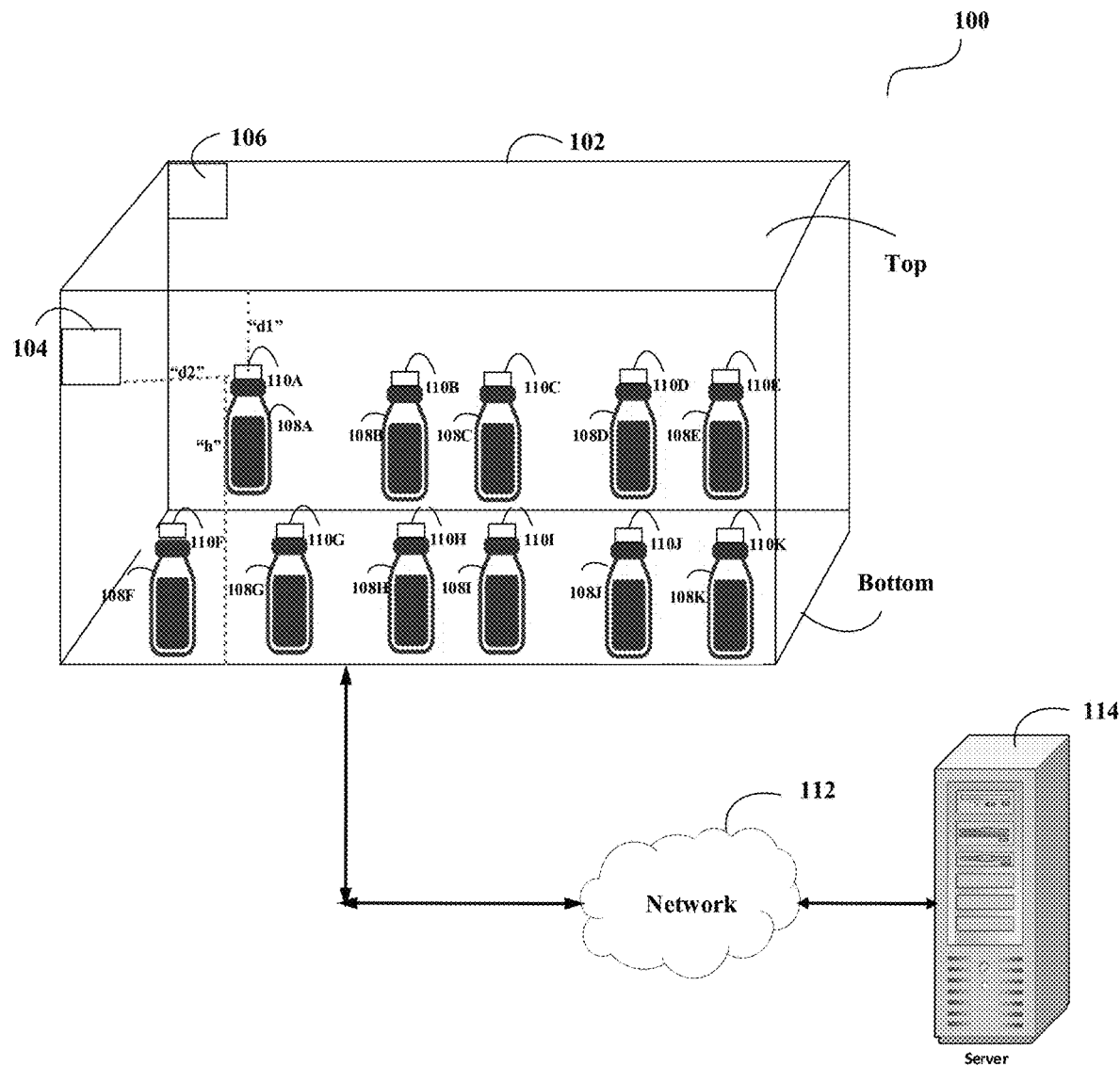
FIG. 1 depicts an exemplary system architecture according to an exemplary embodiment of the invention.

Described herein is the technology with a system and a method for saving power of a battery associated with an item/s. One or more items may be placed inside a container and each of the items may be in communication with a server through a network. Each of the one or more items may determine a location in the container and also determine a charged status of a battery associated with each of the one or more items. Each of the one or more items may transmit the determined location and the charged status of the battery to the server. The server may assign a cluster to a group of items based on the location of each of the one or more items. The server may select the group of items from the one or more items to assign the cluster. The server may further identify a master item from the group of items based on a charged status of a battery associated with each item in the group. For identifying the master item, the server may rank each item in the group based on the charged status of the battery with a highest rank i.e. an item having highest battery than other items in the cluster. Then, the server may transmit a message to the master item to sense a parameter inside the container for the group of items in the cluster. The master item may then transmit sensed parameter for the group of items in the cluster to the server. By doing this, only the master item in the cluster may sense the parameter inside the container for the other items in the cluster and transmit sensed parameter to the server on behalf of other items in the cluster. As a result, the other items in the cluster would not sense any parameter or communicate with the server resulting in preservation of power of a battery associated with each of the other items in the cluster.

As used herein, the item/s includes content for consumption or usage by an end customer. Each of the item/s may have an associated battery for supplying power to an electronic device associated with the item. The electronic device of the item/s may comprise, but is not limited to, a transmitter, a receiver, a location detection module, a battery level determination module, one or more sensor/s, a processor, and/or a memory. Such item/s may be a bottle or a box having liquid content, solid content or semi solid content or any such item known in the art. The content in the item/s may be for any kind of consumption/usage and may be a pharmaceutical content, a liquid content, an eatable content, a lotion, a cream, tablets or any such content known in the art.

As used herein, the container may be used for storing, holding or keeping the item/s. The container may communicate with the item/s and/or the server through a network. The container may comprise, but is not limited to, a beacon and an electronic circuit. The electronic circuit of the container may perform same operations and functions as performed by the electronic device of the item. The electronic circuit may comprise, but is not limited to, a transmitter, a receiver, a location detection module, a battery level determination module, one or more sensor/s, a processor, and/or a memory. Such a container may be a reefer, a box, a receptacle, a storage unit, a cold storage unit or any such unit that is well known in the art.

As used herein, the battery associated with the item/s may be a lithium battery, a lithium-air battery, a mercury battery, an aluminum-air battery, a zinc-air battery or any such any primary cell battery that is well known in the art.

As used herein, the server has processing capabilities as disclosed further in the specification. The server may be a cloud storage, a remote database, or any such storage known in the art.

As used herein, the parameter/s may be sensed by one or more sensor/s. The parameter/s may include, but are not limited to, a temperature parameter, a humidity parameter, an air pressure parameter, a fire parameter, a gas parameter or any such parameter that is known in the art.

As used herein, the one or more sensor/s may possess capability of sensing/monitoring one or more parameters inside the container. The one or more sensors can sense the temperature, humidity, fire, gas, or air pressure inside the container where the item is placed or present. The one or more sensors may include, but are not limited to, a temperature sensor, a humidity sensor, a fire sensor, a gas sensor, an air pressure sensors or any such sensor that are obvious to a person skilled in the art.

As used herein, the network may refer to a mesh network, Global System for Mobile (GSM) network, a Long-Term Evolution (LTE) network, a code-division multiple access (CDMA) network, a narrow-band internet of thing (NB-IoT) technique or category M1 technique, a bluetooth network, a Wi-Fi network, a ZigBee network or any such network/technique that is known in the art.

Throughout the specification, reference numeral 108 depicts a single item. The reference numerals 108A, 108B, 108C . . . 108K may be considered as one or more items. Likewise, throughout the specification, reference numeral 110 depicts a single electronic device coupled to an item. The reference numerals 110A, 110B, 110C . . . 110K may be considered as one or more electronic devices coupled to the one or more items.

FIG. 1 depicts a system architecture 100 for saving power of a battery associated with an item/s, according to an exemplary embodiment of the invention. As depicted in FIG. 1, a container 102, a beacon 104 associated with the container 102, an electronic circuit 106 coupled with the container 102, one or more items 108A-108K placed inside the container 102, and one or more electronic devices 110A-110K coupled with the one or more items 108A-108K. As depicted, the container 102 and/or the one or more items 108A-108K may communicate with a server 114 through a network 112. In an exemplary embodiment, the electronic circuit 106 coupled with the container 102 may be same as the electronic device 110 coupled with an item 108.

The beacon 104 associated with the container 102 may broadcast signal/s inside the container 102. The signal/s may be advertisement/s broadcasted by the beacon 104 in the container 102. Each of the one or more items 108A-108K in the container 104 may detect the signal/s broadcasted by the beacon 104 and may determine a location of the one or more items 108A-108K based on the signal/s broadcasted by the beacon 104. Each of the one or more items 108A-108K may determine the location based on an angle of arrival of the signal from the beacon 104. In particular, the beacon 104 in the container 102 may transmit a special direction finding signal using a single antenna of the beacon 104. Each of the one or more items 108A-108K in the container 102 may have multiple antennae arranged in an array. As the signal transmitted by the beacon 104 crosses the array of the one or more items 108A-108K, each of the one or more items 108A-108K may determine a signal phase difference due to the difference in distance from each of the antenna in its array relative to the transmitting antenna of the beacon 104. Each of the one or more items 108A-108K may take into consideration IQ (i.e. I=Amplitude*cos(angle), Q=Amplitude*sin(angle)) samples of the signal phase difference while switching between the active antenna in the array. Based on the IQ sample data, each of the one or more items 108A-108K may calculate a relative signal direction. Since each of the one or more items 108A-108K may identify its distance (d2) from the beacon 104 based on signal strength and the angle of arrival, a height (h) of the each of the one or more items 108A-108K may be calculated using trigonometry to measure remaining distances (d1) from each of the one or more items 108A-108K to the beacon 104. Also, each of the one or more items 108A-108K may identify location by considering a total measurements (such as height, width and length) of the container 102 as explained below.

Each of the one or more items 108A-108K may utilize the signal/s from the beacon 104 to determine a first factor related to a height ("h") of each of the one or more items 108A-108K from bottom of the container 102. Also, each of the one or more items 108A-108K may further utilize the signal/s from the beacon 104 to determine a second factor related to a distance ("d1") between each of the one or more items 108A-108K and a top wall of the container 102. Further, each of the one or more items 108A-108K may utilize the signal/s from the beacon 104 to determine a third factor related to a distance ("d2") between each of the one or more items 108A-108K and the beacon 104 of the container 102. By using the determined first factor, the determined second factor and/or the determined third factor, each of the one or more items 108A-108K in the container 102 may determine their location. For an instance, as depicted in FIG. 1, an item 108A may determine a height ("h") (i.e. first factor) from bottom of the container 102 up to a place where an electronic device 110A of the item 108A is present. Similarly, the item 108A may determine a distance ("d1") (i.e. second factor) between the item 108A and a top wall of the container 102. The item 108A may also determine a distance ("d2") (i.e. third factor) between the item 108A and the beacon 104 in the container 102. Based on the first factor, the second factor and/or the third factor and total measurements (such as height, width and length) of the container 102, the item 108A may determine an approximate or an exact location three-dimensionally (using three factors).

In addition, when any item inside the container 102 gets displaced from a location or when a location of any item changes during the transit of the container 102, then, such displacement of the item that can be identified by comparing a previous angle of arrival of the signal from the beacon 104 with a current angle of arrival of the signal from the beacon 104 to the item. Alternatively, the displacement of the item can also be identified by a previous angle of arrival of the signal from the beacon 104 with a threshold limit of angle of arrival defined for a particular item. For instance, if the current angle of arrival of the signal does not fall within the threshold limit of a 40 degree angle and a 60 degree angle, in such a situation, the item may again transmit an updated location to the server.

Further, each of the one or more items 108A-108K may also determine a charged status of a battery associated with each of the one or more items 108A-108K. The charged status of the battery corresponds to a level of power or charge stored in the battery. Several approaches well known in the art may be used to detect the charged status of the battery. In an embodiment, each of the one or more items 108A-108K may determine the charged status of the battery based on an occurrence of an event. For an example, the one or more items 108A-108K may detect the charged status of the battery when the one or more items 108A-108K receives an instruction to determine a charged status of the battery from the server 114 through the network 112. In an alternative embodiment, each of the one or more items 108A-108K may determine the charged status of the battery when the one or more items 108A-108K receives an instruction from the container 102.

After each of the one or more items 108A-108K determines the associated location and the charged status of the battery, each of the one or more items 108A-108K may transmit the location and the charged status of the battery to the server 114 through the network 112.

On receiving the location and charged status of the battery of one or more items 108A-108K, the server 114 may assign a cluster to a group of items from the one or more items 108A-108K. In an exemplary embodiment, the server 114 may assign a cluster to a group of items from the one or more items 108A-108K based on a relative distance between two items. In another embodiment, the server 114 may assign a cluster to a group of items from the one or more items 108A-108K based on an approximate or exact location of the one or more items 108A-108K where the one or more items 108A-108K are placed inside the container 102. In another embodiment, the server 114 may assign a cluster to a group of items when the first factor ("h"), the second factor ("d1") and the third factor ("d2") of each of the one or more items 108A-108K fall within threshold values. Such threshold values may be defined by a manufacturer of an item, a manufacturer of content inside the item etc. The server 114 may use any one or two of these embodiments or all of these embodiments to assign a cluster to a group of items.

Figure 2:
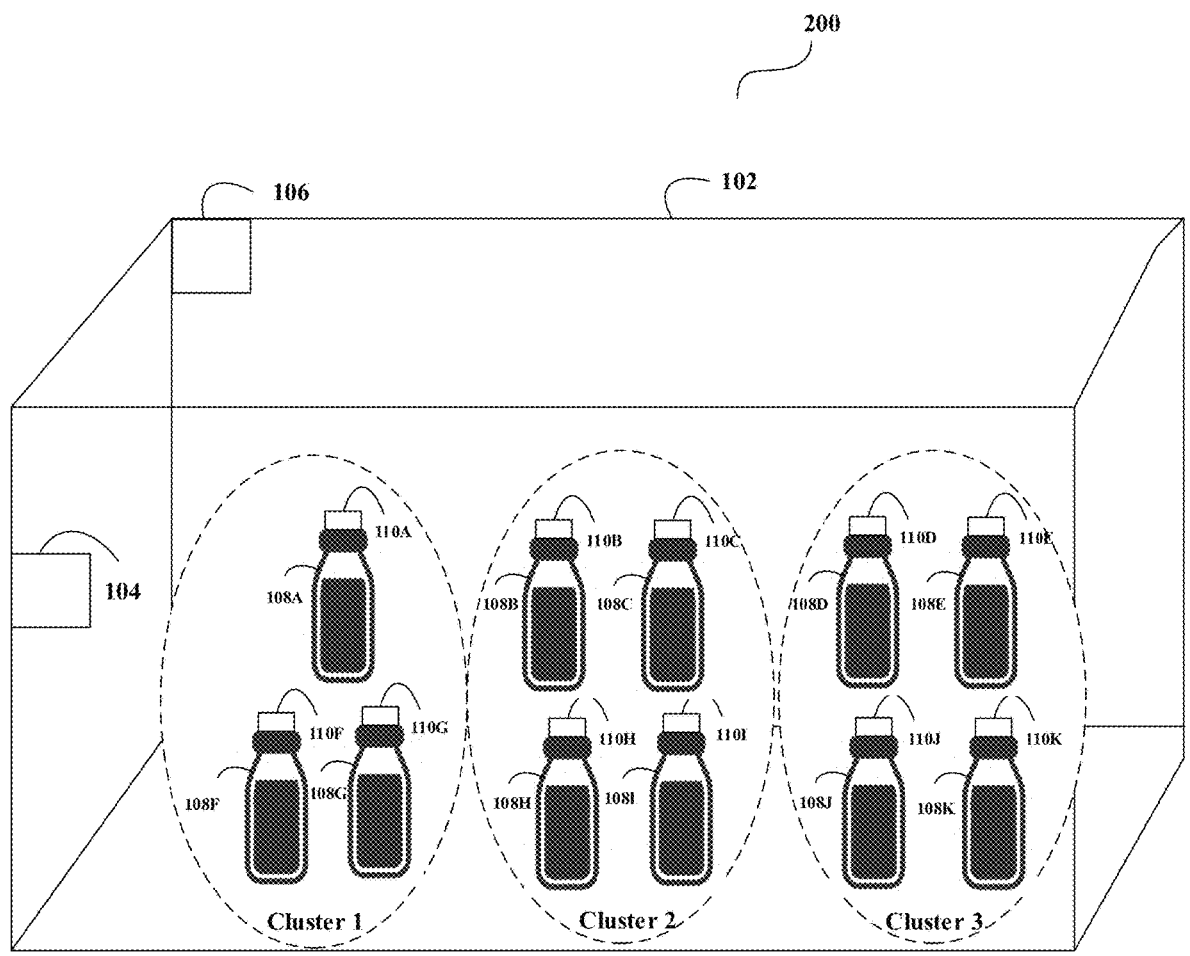
FIG. 2 depicts an exemplary grouping of items in a cluster according to an exemplary embodiment of the invention.

FIG. 2 depicts an exemplary scenario for clustering of items 108A-108K. The server 114 may group item 108A, item 108F and item 108G in a cluster 1. Similarly, the server 114 may group item 108B, item 108C, item 108H and item 108I in a cluster 2. Likewise, the server 114 may group item 108D, item 108E, item 108J and item 108K in a cluster 3. In order to assign a cluster to a group of items from the one or more items 108A-108K, the server 114 may consider the factors described above. The present invention also encompasses the server 114 to iteratively assign cluster to an item when any item of a cluster inside the container 102 gets displaced from a location during the transit of the container 102. Based on an updated location of the item, the server 114 assign a cluster to an item again.

Once each of the one or more items 108A-108K in the container 102 assigned a cluster, the server 114 may identify a master item from a group of items in the cluster based on the charged status of each item in the cluster. For this, considering FIG. 2 and an exemplary Table 1 below showing the three clusters, respective group of items in a cluster, a charged status of battery of each items in each cluster, and a master item in each cluster.

TABLE 1

| Cluster Name | Group of Items | Charged Status of Battery | Ranking of Items based on Charged Status | Master Item |
|---|---|---|---|---|
| Cluster 1 | Item 108A | 90% | Item 108A | Item 108A |
|  | Item 108F | 70% | Item 108G |  |
|  | Item 108G | 75% | Item 108F |  |

TABLE 1-continued

| Cluster Name | Group of Items | Charged Status of Battery | Ranking of Items based on Charged Status | Master Item |
|---|---|---|---|---|
| Cluster 2 | Item 108B | 80% | Item 108C | Item 108C |
|  | Item 108C | 95% | Item 108H |  |
|  | Item 108H | 85% | Item 108B |  |
|  | Item 108I | 75% | Item 108I |  |
| Cluster 3 | Item 108D | 90% | Item 108K | Item 108K |
|  | Item 108E | 75% | Item 108D |  |
|  | Item 108J | 83% | Item 108J |  |
|  | Item 108K | 98% | Item 108E |  |

As provided in exemplary Table 1 above, the exemplary Cluster 1 may have item 108A, item 108F and item 108G. The server 114 may rank these item 108A, item 108F and item 108G in the Cluster 1 based on a charged status of battery of each item 108A, item 108F and item 108G. As can be seen in Table 1, the item 108A (i.e. with 90% charge) may be ranked higher than the item 108F (i.e. with 70% charge) and the item 108G (i.e. with 75% charge). Accordingly, the server 114 may identify the item 108A as a master item in Cluster 1 based on the charged status (i.e. 90%) of battery of the item 108A.

Similarly, the exemplary Cluster 2 may have item 108B, the item 108C, the item 108H and item 108I. The server 114 may rank these item 108B, the item 108C, the item 108H and item 108I in the Cluster 2 based on a charged status of battery of each item 108B, the item 108C, the item 108H and item 108I. As can be seen in Table 1, the item 108C (i.e. with 95% charge) may be ranked higher than the item 108B (i.e. with 80% charge), the item 108H (i.e. with 85% charge) and item 108I (i.e. with 75% charge). Accordingly, the server 114 may identify the item 108C as a master item in Cluster 2 based on the charged status (i.e. 95%) of battery of the item 108C.

Also, the exemplary Cluster 3 may have item 108D, item 108E, item 108J and item 108K. The server 114 may rank item 108D, item 108E, item 108J and item 108K in the Cluster 3 based on a charged status of battery of each item 108D, item 108E, item 108J and item 108K. As can be seen in Table 1, the item 108K (i.e. with 98% charge) may be ranked higher than the item 108D (i.e. with 90% charge), the item 108E (i.e. with 75% charge), and the item 108J (i.e. with 83% charge). Accordingly, the server 114 may identify the item 108K as a master item in Cluster 3 based on the charged status (i.e. 98%) of battery of the item 108K.

After the server 114 identifies the master item (item 108A, item 108C, item 108K), the server 114 may transmit a message through the network 112 to each of the master item (item 108A, item 108C, item 108K) in each respective cluster (Cluster 1, Cluster 2, Cluster 3) for sensing a parameter for the group of items inside the container 102. Then, the master may start sensing the parameter inside the container 102. The master item of each cluster may transmit sensed parameter to the server 112 through the network 112 on behalf of the other items in the cluster. Following the exemplary Table 1 above, the server 114 may transmit a message to the master item 108A in the Cluster 1 for sensing a parameter (such a temperature etc.) for the group of items (i.e. item 108F and item 108G) inside the container 102. Accordingly, the master item 108A may sense the parameter (such a temperature, gas etc.) inside the container 102 and may transmit sensed parameter (such as sensed temperature as 18 degree Celsius) to the server 114 through the network 112 on behalf of the other items (i.e. item 108F and item 108G). Also, the server 114 may transmit a message to the master item 108C in the Cluster 2 for sensing a parameter for the group of items (i.e. item 108B, item 108H and item 108I) inside the container 102. Accordingly, the master item 108C may sense the parameter inside the container 102 in the cluster 2 and may transmit sensed parameter to the server 114 through the network 112 on behalf of the other items (i.e. item 108B, item 108H and item 108I). Moreover, the server 114 may transmit a message to the master item 108K in the Cluster 3 for sensing a parameter for the group of items (i.e. item 108D, item 108E, item 108J) inside the container 102. Accordingly, the master item 108K may sense the parameter inside the container 102 and may transmit sensed parameter to the server 114 through the network 112 on behalf of the other items (i.e. item 108D, item 108E, item 108J) in the cluster 3. It is to be noted that transmitting the sensed parameter further comprises sensing multiple parameters for the items and transmitting the multiple sensed parameters to the server 114.

The present invention facilitates a master item in a cluster to sense the parameter inside the container 102 only when all the other items in the cluster act in a same pre-defined behavior. The same pre-defined behavior may be exhibited by the items in the cluster when the sensed parameter monitored by the items in the cluster are equal or same. In an exemplary embodiment, a sensed parameter (say temperature of 23 degree Celsius) monitored by an electronic circuit 106 and sensed parameter (say temperature of 23.2 degree Celsius) monitored by the master item in the cluster are same or equal. In another exemplary embodiment, a sensed parameter (say temperature of 23.2 degree Celsius) monitored by the master item in the cluster and the sensed parameter (say temperature of 23 degree Celsius) monitored by the other item in the cluster are same or equal. In such a situation, the master item may transmit the sensed parameter monitored by the master item to the server on behalf of other items in the cluster. The present invention also facilitates a master item to determine if all the other items in the cluster do not act in a same pre-defined behavior. The other items in the cluster do not act in a same pre-defined behavior when the sensed parameter monitored by the other items and the master item in the cluster are not equal/same. In an exemplary embodiment, a sensed parameter (say temperature of 23 degree Celsius) monitored by an electronic circuit 106 and sensed parameters (say temperature of 18 degree Celsius) monitored by the master item in the cluster are not equal/same. In an exemplary alternative embodiment, a sensed parameter (say temperature of 18 degree Celsius) monitored by the master item in the cluster and the sensed parameter (say temperature of 27 degree Celsius) monitored by the other item in the cluster are not equal/same. In such a situation, the master item may collect the sensed parameters from the other items in the cluster and may transmit the sensed parameter monitored by the other items to the server 114. In all the situations stated above, the other items in the cluster do not communicate with the server 114 resulting in power saving of a battery of other items. Moreover, the one or more items 108A-108K are placed inside the container 102 for refrigeration. Usually refrigerated cabin temperature inside the container 102 goes below atmospheric temperature (may be upto minus 60 degree celcius which may also cause battery discharge behaviour. Thus by using the present invention, the battery of the one or more items 108A-108K inside the container 102 will be preserved efficiently.

Moreover, the server 114 may iteratively identify a new master item in each cluster (Cluster 1, Cluster 2, Cluster 3) based on the charged status of the items in the each cluster (Cluster 1, Cluster 2, Cluster 3). The server 114 may identify the new master item when the charged status of the battery of the existing master item (item 108A, item 108C, item 108K) falls below a pre-defined threshold value. For this, the server 114 may compare a latest charged status of the battery of the master item (item 108A, item 108C, item 108K) with the defined threshold value. For an example, the server 114 may identify a new master item for a cluster (Cluster 1, Cluster 2, Cluster 3) when a latest charged status of the battery of the master item (item 108A, item 108C, item 108K) falls below the pre-defined threshold value of 50% charge. As used herein, the pre-defined threshold value may be defined by a manufacturer of the container 102, a manufacturer of the item 108 or any such person. And, when the latest charged status of the battery of the master item (item 108A, item 108C, item 108K) falls below the defined threshold value, then the server 114 may again rank a group of item in a cluster (Cluster 1, Cluster 2, Cluster 3) based on a charged status of a battery of each other item in each cluster (Cluster 1, Cluster 2, Cluster 3) and accordingly, identify a new master item for each cluster (Cluster 1, Cluster 2, Cluster 3) with a charged status higher than other items in the cluster. For an instance, the server 114 may identify item 108G as new master item in Cluster 1 as a charged status (75%) of battery of item 108G is higher than a charged status (70%) of battery of item 108F. For cluster 2, the server 114 may identify item 108H as new master item in Cluster 2 as a charged status (85%) of battery of item 108H is higher than a charged status (80%) of battery of item 108B and than a charged status (75%) of battery of item 108I. For cluster 3, the server 114 may identify item 108D as new master item as a charged status (90%) of battery of item 108D is higher than a charged status (75%) of battery of item 108E and than a charged status (83%) of battery of item 108J.

Although the present invention has been explained by depicting three exemplary clusters having three or more items inside each cluster; however, it is understood for a person skilled in the art that any number of cluster may be created by the present invention having any number of items.

Figure 3:
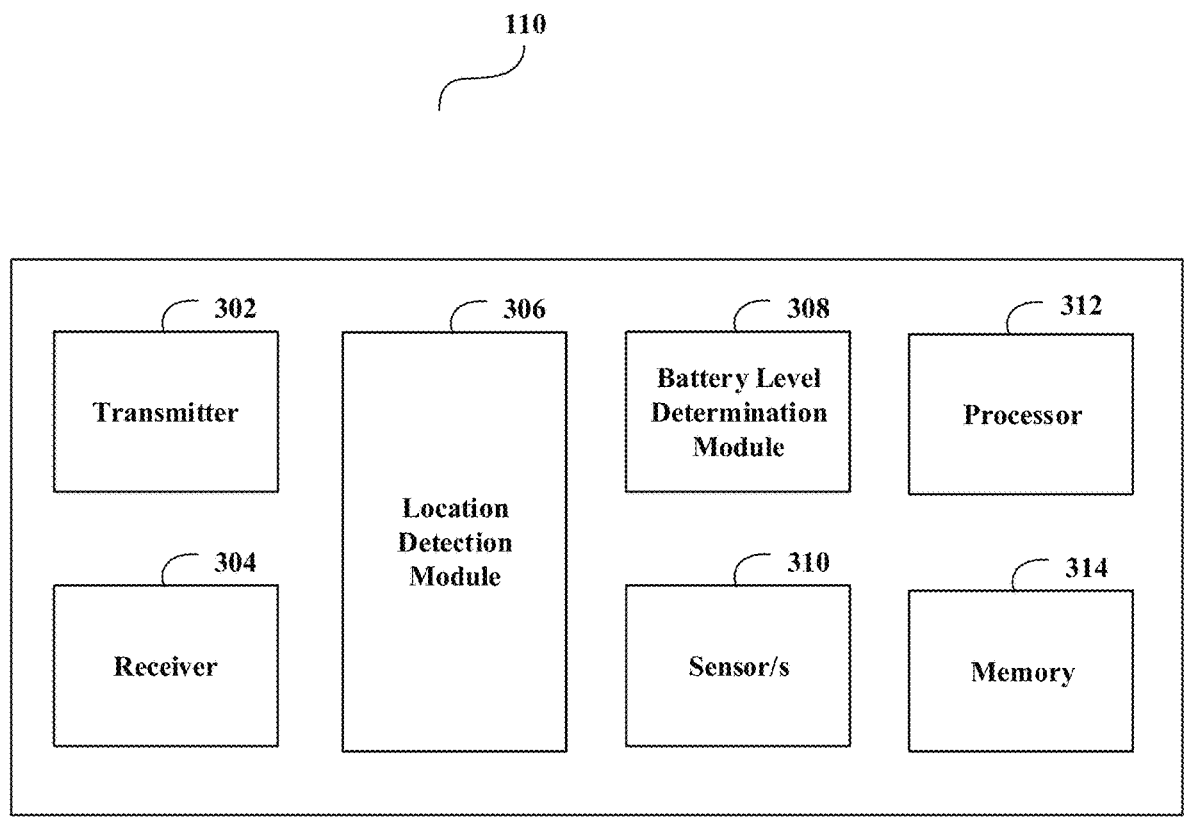
FIG. 3 depicts block diagram of different components of an electronic circuit coupled with an item according to an exemplary embodiment of the invention.

FIG. 3 depicts a block diagram of different components of an electronic device 110 coupled with an item 108 according to an exemplary embodiment of the invention. The electronic device 110 may comprise of, but is not limited to, a transmitter 302, a receiver 304, a location detection module 306, a battery level determination module 308, one or more sensors 310, a processor 312 and/or a memory 314. The receiver 304 of the electronic device 110 coupled with the item 108 may be adapted to receive signal/s broadcasted by a beacon 104 of a container 102. The location detection module 306 of the electronic device 110 coupled with the item 108 may be adapted to determine a location of the item 108 based on the signal/s from the beacon 104 of the container 102. Specifically, the location detection module 306 may determine the location of the item 108 based on an angle of arrival of the signal from the beacon 104. The location detection module 306 may also be adapted to utilize the signal/s from the beacon 104 to determine a first factor related to a height ("h") of the item 108 from a bottom of the container 102, a second factor related to a distance ("d1") between the items 108 and a top wall of the container 102, and/or a third factor related to a distance ("d2") between the item 108 and the beacon 104 in the container 102. By using the determined first factor, the determined second factor and/or the determined third factor, the location detection module 306 may determine the location of the item 108. The battery level determination module 308 of the electronic device 110 coupled with the item 108 may be adapted to determine a charged status of a battery associated with the item 108. The charged status of the battery corresponds to a level of power, charge or voltage of the battery. The location detection module 306 may communicate the location of the item 108 and the battery level determination module 308 may communicate the charged status of the battery associated with the item 108 to the transmitter 302.

The transmitter 302 of the electronic device 110 coupled with the item 108 may be adapted to transmit the location of the item 108 and the charged status of the battery associated with the item 108 to the server 114 through the network 112. Further, the receiver 304 of the electronic device 110 coupled with the item 108 may be adapted to receive a message from the server 114 for sensing a parameter inside the container 102 for a group of items in the cluster. Furthermore, the one or more sensors 310 of the electronic device 110 coupled with the item 108 may be adapted to sense one or more parameters inside the container and communicate sensed parameter to the transmitter 302. The transmitter 302 may be adapted to transmit the sensed parameter to the server 114 through the network 112. The memory 314 of the electronic device 110 coupled with the item 108 may be adapted to store the location of the item 108, the charged status of the battery associated with the item 108 and/or the sensed parameter by the item 108. Moreover, the transmitter 302, the receiver 304, the location detection module 306, the battery level determination module 308, the one or more sensors 310, and/or the memory 314 may be communicably coupled with the processor 312. The different units described herein are exemplary. The invention may be performed using one or more units. For example, the tasks executed by the transmitter 302, the receiver 304, the location detection module 306, the battery level determination module 308, the one or more sensors 310, the memory 314 and/or the processor 312 may be performed by a single unit. Alternatively more number of units as described herein may be used to perform the invention.

Figure 4:
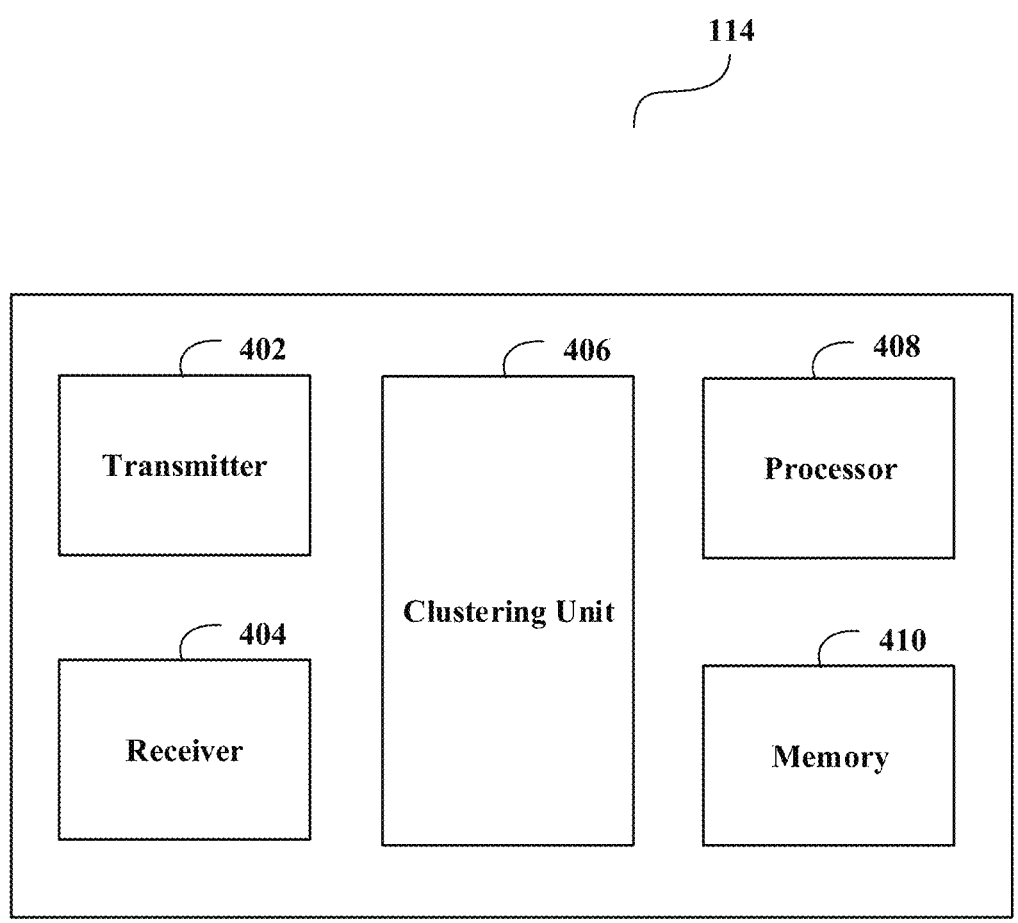
FIG. 4 depicts block diagram of different components of a server according to an exemplary embodiment of the invention.

FIG. 4 depicts a block diagram of different components of a server 114 according to an exemplary embodiment of the invention. The server 114 may comprise of, but is not limited to, a transmitter 402, a receiver 404, a clustering unit 406, a processor 408 and a memory 410. The receiver 404 of the server 114 may be adapted to receive a location of an item 108 and a charged status of a battery associated with the item 108 from the item 108 through the network 112. The receiver 404 may also communicate with the location of the item 108 and the charged status of the battery to the clustering unit 406. The clustering unit 406 of the server 114 may be adapted to assign a cluster to a group of items from the item 108 based on the location of the item 108 as explained above in FIG. 1 above. The processor 408 of the server 114 may communicate with the clustering unit 406 and may be adapted to identify a master item from the group of items in the cluster based on the charged status of each item in the cluster. For this, the processor 408 may rank the group of items in the cluster based on the charged status of each item in the cluster. This has been explained in details in FIG. 1 and exemplary Table 1.

The processor 408 may also communicate a unique identifier associated with the master item of each cluster to the transmitter 402. The transmitter 402 of the server 114 may be adapted to transmit a message to the master item (through the network 112) using the unique identifier for sensing a parameter inside the container 102 for the group of items in each cluster. Further, the receiver 404 of the server 114 may be adapted to receive a sensed parameter from the master item for the group of items in the cluster. Alternatively, the transmitter 402 of the server 114 may also be adapted to transmit a message to the one or more items 108 in the container 102 for sensing the parameter in the container 102 when the one or more items 108 in the cluster do not act in a pre-defined behavior. Accordingly, the receiver 404 of the server 114 may be adapted to receive the sensed parameter from the one or more items 108 through the network 112. Also, the transmitter 402, the receiver 404, the clustering unit 406, and/or the memory 410 may be communicably coupled the processor 408. The different units described herein are exemplary. The invention may be performed using one or more units. For example, the tasks executed by the transmitter 402, the receiver 404, the clustering unit 406, the memory 410 and/or the processor 408 may be performed by a single unit. Alternatively more number of units as described herein may be used to perform the invention.

Figure 5:
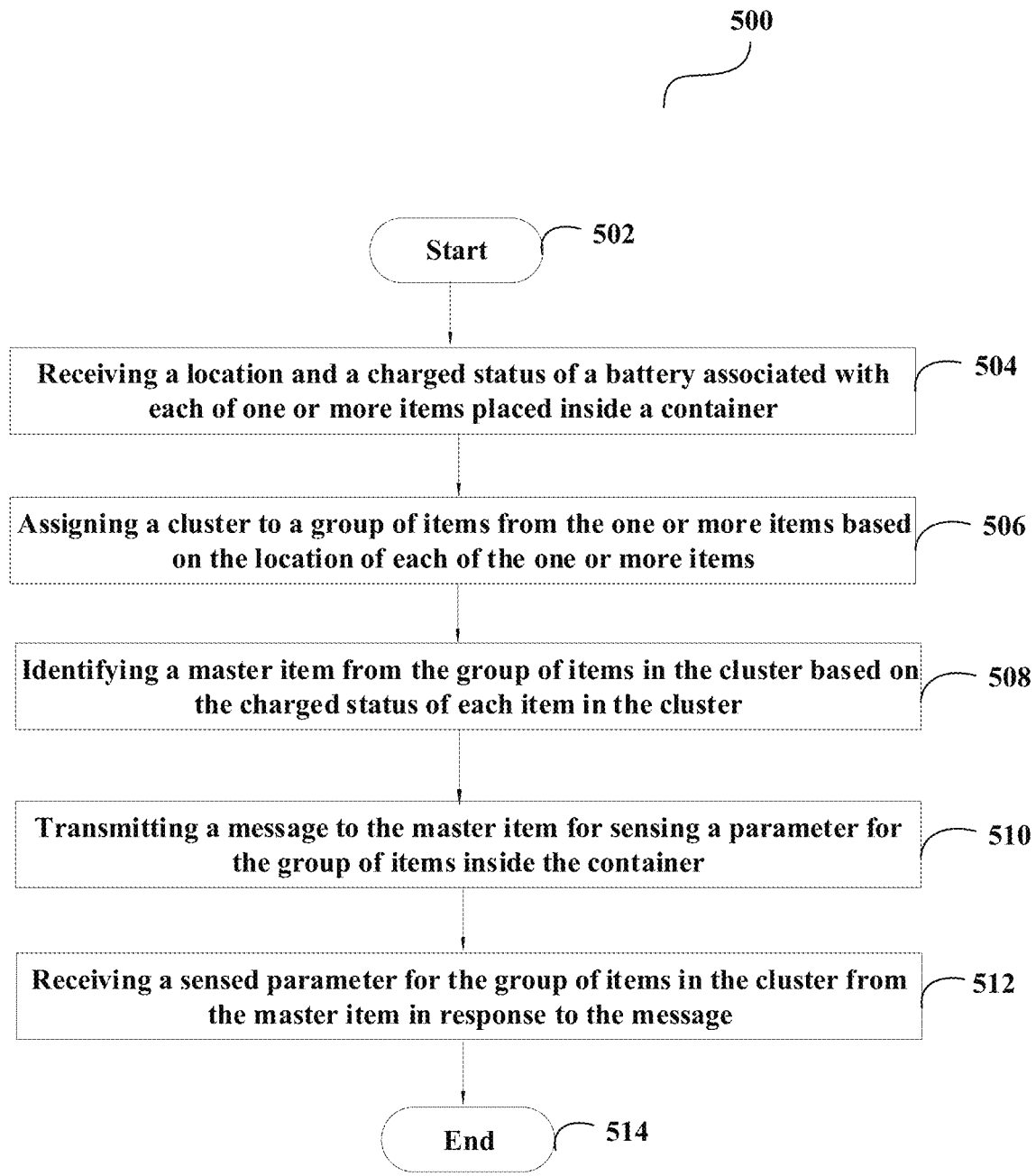
FIG. 5 depicts an exemplary flowchart illustrating a method to perform the invention according to an exemplary embodiment of the invention.

FIG. 5 depicts a flowchart outlining the features of the invention in an exemplary embodiment of the invention. The method flowchart 500 describes a method being for saving power of a battery associated with an item/s. The method flowchart 500 starts at step 502.

At step 504, the server 114 or the container 102 may receive a location and a charged status of a battery associated with each of one or more items 108A-108I placed inside a container 102. The server 114 or the container 102 may receive the location and the charged status of the battery from the one or more items 108A-108I. This has been explained in details in FIG. 1 above.

At step 506, the server 114 or the container 102 may assign a cluster to a group of items from the one or more items 108A-108I based on the location of each of the one or more items 108A-108I. This has been explained in details in FIG. 2 and exemplary Table 1 above.

At step 508, the server 114 or the container 102 may identify a master item from the group of items in the cluster based on the charged status of each item in the cluster. This has been explained in details in FIG. 2 and exemplary Table 1 above.

At step 510, the server 114 or the container 102 may transmit a message to the master item for sensing a parameter inside the container 102 for the group of items in the cluster. This has been explained in details in FIG. 2 and exemplary Table 1 above.

At step 512, the server 114 or the container 102 may receive a sensed parameter for the group of items in the cluster from the master item in response to the message as explained above. Then, the method flowchart 500 may end at 514.

The present invention is applicable to various fields such as, but not limited to, pharmaceutical industry, cosmetics industry, food industry and any such field that is well known in the art and where an item can be utilized.

The present invention provides the following technical advantages over the existing solutions a) preserves power of a battery associated with an item, b) extends life of a battery by saving power, c) prevents an item from becoming non-operational due to lack of power in a battery, d) employs clustering technique to identify a master item for sensing parameters, e) avoids communication of other items in a cluster with a server, and (f) enabling the other items in the cluster to save power of a battery by not communicating with the server.

In one embodiment of the invention, the invention can be operated using the one or more computer readable devices. The one or more computer readable devices can be associated with a server 114 or a container 102. A computer readable medium comprises one or more processors and a memory coupled to the one or more processors, the memory stores instructions executed by the one or more processors, the one or more processors configured to receive a location and a charged status of a battery associated with each of one or more items 108A-108I placed inside a container 102. The memory stores instructions executed by the one or more processors, the one or more processors configured to assign a cluster to a group of items from the one or more items 108A-108I based on the location of each of the one or more items 108A-108I and identify a master item from the group of items in the cluster based on the charged status of each item in the cluster. The memory stores instructions executed by the one or more processors, the one or more processors also configured to transmit a message to the master item for sensing a parameter inside the container 102 for the group of items in the cluster and receive a sensed parameter for the group of items in the cluster from the master item in response to the message.

The embodiments of the invention and the tables discussed herein are exemplary and various modification and alterations to a person skilled in the art are within the scope of the invention. Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A system comprising:
a container with a beacon, the beacon adapted to broadcast a signal inside the container;

one or more items placed inside the container, the one or more items comprising:
a location detection module adapted to determine a location based on the signal received from the beacon;
a battery level determination module adapted to determine a charged status of a battery associated with each of the one or more items; and
a transmitter adapted to transmit the location and the charged status of the battery associated with each of the one or more items to a server; and the server comprising:
a receiver adapted to receive the location and the charged status of the battery associated with each of the one or more items from the transmitter of the one or more items;
a clustering unit adapted to assign a cluster to a group of items from the one or more items based on the location of each of the one or more items;
a processor adapted to identify a master item from the group of items in the cluster based on the charged status of each item in the cluster;
a transmitter adapted to transmit a message to the master item for sensing a parameter inside the container for the group of items in the cluster; and
the receiver further adapted to receive a sensed parameter for the group of items in the cluster from the master item in response to the message;
wherein the signal from the beacon is utilized to determine a first factor related to a height of each of the one or more items from bottom of the container, a second factor related to a distance between each of the one or more items and a top wall of the container, and a third factor related to a distance between each of the one or more items and the beacon in the container.

2. The system of claim 1, wherein the location detection module is adapted to determine the location of each of the one or more items in the container based on an angle of arrival of the signal from the beacon.

3. The system of claim 1, wherein the clustering unit is adapted to assign a same cluster to a group of items when a first factor, a second factor and a third factor of the one or more items fall within a threshold value.

4. The system of claim 1, wherein the processor is adapted to identify the master item by ranking the group of items in the cluster based on a charged status of a battery associated with each item in the cluster.

5. The system of claim 1, wherein the master item is ranked higher than other items in the cluster.

6. The system of claim 1, wherein the charged status of a battery associated with the master item is higher than each of charged status of a battery associated with other items in the cluster.

7. The system of claim 1, wherein the master item transmits the sensed parameter to the server on behalf of other items in the cluster.

8. The system of claim 1, wherein each of the group of items in the cluster act in a pre-defined behavior.

9. The system of claim 1, wherein the master item collects sensed parameter from other items in the cluster and transmit the sensed parameter to the server when the other items in the cluster do not act in a pre-defined behavior.

10. The system of claim 1, wherein the parameter comprises a temperature parameter, a humidity parameter, a fire parameter, or a gas parameter.

11. A method comprising:
receiving a location and a charged status of a battery associated with each of one or more items placed inside a container;
assigning a cluster to a group of items from the one or more items based on the location of each of the one or more items;
identifying a master item from the group of items in the cluster based on the charged status of each item in the cluster;
transmitting a message to the master item for sensing a parameter inside the container for the group of items in the cluster; and
receiving a sensed parameter for the group of items in the cluster from the master item in response to the message;
wherein a signal from a beacon inside a container is utilized to determine a first factor related to a height of each of the one or more items from bottom of the container, a second factor related to a distance between each of the one or more items and a top wall of the container, and a third factor related to a distance between each of the one or more items and the beacon in the container.

12. The method of claim 11, wherein the location of each of the one or more items is determined based on an angle of arrival of the signal transmitted by the beacon of the container.

13. The method of claim 11, wherein the group of items are assigned a same cluster when a first factor, a second factor and a third factor of the one or more items fall within a threshold value.

14. The method of claim 11, wherein the master item is identified by ranking the group of items in the cluster based on a charged status of a battery associated with each item in the cluster.

15. The method of claim 11, wherein the master item is ranked higher than other items in the cluster.

16. The method of claim 11, wherein the master item transmits the sensed parameter to the server on behalf of other items in the cluster.

17. The method of claim 11, wherein each of the group of items in the cluster act in a pre-defined behavior.

18. A non-transitory computer readable medium storing instructions being executed by the one or more processors, the one or more processors configured to:
receive a location and a charged status of a battery associated with each of one or more items placed inside a container;
assign a cluster to a group of items from the one or more items based on the location of each of the one or more items;
identify a master item from the group of items in the cluster based on the charged status of each item in the cluster;
transmit a message to the master item for sensing a parameter inside the container for the group of items in the cluster; and
receive a sensed parameter for the group of items in the cluster from the master item in response to the message;
wherein a signal from a beacon in the container is utilized to determine a first factor related to a height of each of the one or more items from bottom of the container, a second factor related to a distance between each of the one or more items and a top wall of the container, and a third factor related to a distance between each of the one or more items and the beacon in the container.

* * * * *